Sept. 9, 1924.
F. W. GREVE
PITOMETER
Filed Dec. 11, 1922
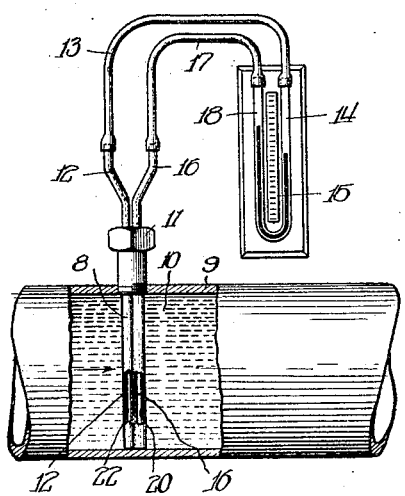
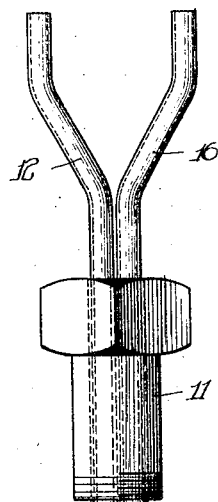
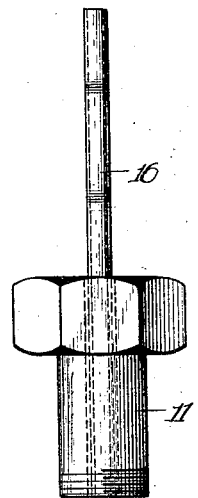
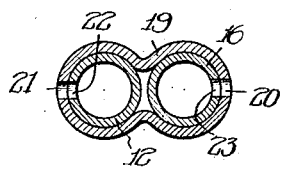
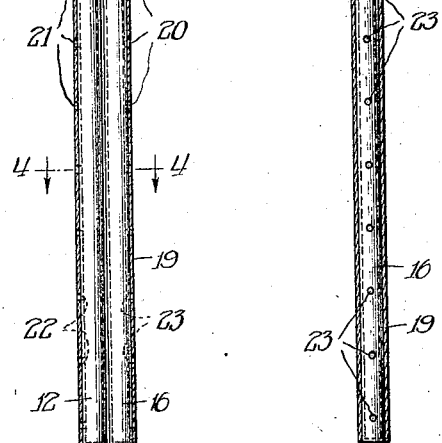
Witness:
A. Burkhardt
Inventor:
F. W. Greve,
By Wilkinson, Huxley, Byron & Knight
Attys.

Patented Sept. 9, 1924.

1,508,017

UNITED STATES PATENT OFFICE.

FREDERICK W. GREVE, OF WEST LAFAYETTE, INDIANA.

PITOMETER.

Application filed December 11, 1922. Serial No. 606,320.

*To all whom it may concern:*

Be it known that I, FREDERICK W. GREVE, a citizen of the United States, residing at West Lafayette, in the county of Tippecanoe and State of Indiana, have invented certain new and useful Improvements in a Pitometer, of which the following is a specification.

This invention relates to a new and improved pitometer and more particularly to a pitometer adapted to integrate the effect of velocity across the flow of fluid and register the integrated result or mean velocity.

As is well known in the art, a pitometer comprises a pair of tubes adapted for immersion in the fluid whose flow is to be measured, one tube recording the static pressure plus the velocity pressure, and the other the static pressure minus the velocity pressure. With such tubes as generally constructed, it is necessary to take a number of readings with the pressure receiving portions of the tubes located at different depths in the fluid, and then to integrate the results obtained in order to determine the mean velocity.

The two tubes of the pitometer are commonly connected to opposite sides of a differential gage, and theoretically, the velocity of the fluid flow will be equal to the square root of $2gh$, where $g$ is the attraction due to gravity, and $h$ is the reading on the differential gage expressed in feet of water.

The actual recorded velocity will differ from the theoretical velocity due to the various inaccuracies inherent in the instrument, such as frictional and pressure losses. This inaccuracy may be expressed as a coefficient C, and the instrument should be so designed as to cause C to be substantially constant, in which case the actual velocity will be determined by multiplying the theoretical velocity by this coefficient. Obviously, the measurement of velocity with the consequent determination of the amount of flow becomes a somewhat protracted process when it is necessary, as with prior devices, to take separate readings at varying points throughout the depth of flow.

It is an object of the present invention to provide a pitometer adapted to automatically integrate the varying velocities at different points in the fluid flow and to thus show the mean velocity with one setting of the tube and with one reading of the differential gage.

It is an additional object to provide a pitometer of this character which is simple and rugged in design and construction and which may be manufactured at a comparatively small cost.

Other and further objects will appear as the description proceeds.

I have illustrated certain preferred embodiments in the accompanying drawings, in which—

Figure 1 is a view partly in section, showing my improved pitometer and the associated differential gage;

Figure 2 is a view showing the pitometer on an enlarged scale;

Figure 3 is an edge view of Figure 2;

Figure 4 is a section on line 4—4 of Figure 2 upon an enlarged scale; and

Figure 5 is a fragmentary detail showing a modified form of pitometer.

Referring first to Figure 1, the pitometer 8 is inserted through an opening into the pipe 9 which pipe has a fluid 10 flowing therethrough. A bushing and stuffing box 11 retains the pitometer in place in the pipe and prevents leakage of the liquid. The upstream pitometer tube 12 is connected by tubing 13 to the leg 14 of the differential gage 15. The downstream tube 16 is connected by tubing 17 to the leg 18 of the differential gage 15.

As shown in detail in Figures 2 to 4, the tubes 12 and 16 are encased in a sheath 19 which retains the tubes in parallel relation. Perforations 20 and 21 are formed in the opposite faces of the sheath, and perforations 22 and 23 are formed in the tubes 12 and 16, these perforations registering with those in the sheath.

An alternative form of construction is shown in Figure 5 in which tube 30 is enclosed in sheath 31. In this case, the tube is provided with a longitudinal slot 32 which extends throughout the effective height of the tube. In the form shown in Figures 2 and 3, the spaced openings in the tubes and sheath form a series likewise extending throughout the effective length of the tubes.

The complete installation is shown somewhat diagrammatically in Figure 1, the direction of flow being indicated by an arrow. The pressure in the upstream tube 12 is greater than that in the downstream tube due to the velocity pressure which is transmitted to the fluid in tube 12 through the openings 22 which are directed toward the flow. The downstream openings 23 in the tube 16 permit the transmission to the fluid in the tube of the negative pressure caused by the flow of fluid in the pipe. Consequently, the recording means in the differential gage is displaced somewhat as shown in the figure. Obviously, the amount of displacement depends upon the velocity of flow in the pipe 9.

By means of the spaced openings or by means of the slot in the form of construction shown in Figure 5, the effect transmitted to the differential gage is an integration of the effect throughout the entire height of the flowing liquid.

The device as shown has undergone tests under varying conditions and the coefficient C has been found to be a constant. The sheath serves to protect the tubes and to maintain them in proper relation. While the showing and description relate to the use of the pitometer in connection with flow in pipes, it may obviously be used for measuring flow in open flumes or streams.

The device is capable of modification to meet varying conditions, and it is my intention to cover such changes as come within the scope of the appended claim.

I claim:

A pitometer comprising a pair of juxtaposed tubes adapted for use with a differential gage, said tubes being each provided upon its side opposite to the adjacent tube with pressure receiving openings throughout substantially the effective length of the tube, and a single sheath enclosing the two tubes provided with openings registering with the openings in the tubes, the sheath serving to maintain the tubes in fixed parallel relation and to protect the tubes.

Signed at West Lafayette, Indiana, this seventh day of December, 1922.

FREDERICK W. GREVE.